United States Patent
Zhou

(10) Patent No.: US 8,774,302 B2
(45) Date of Patent: Jul. 8, 2014

(54) WIRELESS COMMUNICATION SYSTEM AND WIRELESS COMMUNICATION METHOD

(75) Inventor: Liang Zhou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 13/339,314

(22) Filed: Dec. 28, 2011

(65) Prior Publication Data

US 2012/0236955 A1  Sep. 20, 2012

(30) Foreign Application Priority Data

Mar. 17, 2011  (JP) .................................. 2011-059692

(51) Int. Cl.
*H04B 7/02* (2006.01)
*H04L 1/02* (2006.01)

(52) U.S. Cl.
USPC .......................................................... 375/267

(58) Field of Classification Search
USPC .......................................................... 375/267
See application file for complete search history.

(56) References Cited

U.S. PATENT DOCUMENTS

| 7,873,113 B2 * | 1/2011 | Takano et al. ................. 375/267 |
| 2005/0075081 A1 * | 4/2005 | Catreux-Erceg et al. ....... 455/78 |

FOREIGN PATENT DOCUMENTS

JP  2009-159377 A  7/2009

* cited by examiner

*Primary Examiner* — Shuwang Liu
*Assistant Examiner* — Nader Bolourchi
(74) *Attorney, Agent, or Firm* — Fujitsu Patent Center

(57) ABSTRACT

A wireless communication system 1 performs MIMO communication between a wireless base station 10 with a plurality of antennas 14 and a mobile terminal 20 with a plurality of antennas 24. A wireless base station 10 includes a selector 25 that selects, from the pairs of the antennas, one pair for which the gain is largest; the selector 25 that updates an inverse matrix of a channel matrix with respect to a group of pairs of unselected antennas to acquire inverse matrices and that selects a pair from the group on the basis of the acquire inverse matrices; and a RF switch 13 that performs communication by using the selected antennas. The selector 25 continues to update the inverse matrix and continues to select a pair from the group until a predetermined number of antennas have been selected.

12 Claims, 6 Drawing Sheets

WIRELESS COMMUNICATION SYSTEM AND WIRELESS COMMUNICATION METHOD

CROSS-REFERENCE TO RELATED APPLICATION

This application is based upon and claims the benefit of priority of the prior Japanese Patent Application No. 2011-059692, filed on Mar. 17, 2011, the entire contents of which are incorporated herein by reference.

FIELD

The embodiment discussed herein is directed to a wireless communication system, a wireless communication apparatus, and a wireless communication method for performing multiple-input multiple-output (MIMO) communication.

BACKGROUND

A multiple-input multiple-output (MIMO) communication system is proposed as a wireless communication system that improves the transmission speed by using spatial multiplexing or that achieves high reliability by using the diversity effect that uses different propagation characteristics of multiple paths. In the MIMO communication system, for example, a wireless communication apparatus (e.g., a transmitter) with multiple antennas can simultaneously transmit data by using the antennas, and a wireless communication apparatus (e.g., a receiver), which is the other end of the communication, can simultaneously receive the data by using multiple antennas.

In an MIMO communication system, there are multiple communication methods for single user (SU)-MIMO communication, multiuser (MU)-MIMO communication, MIMO ad hoc multihop communication, cooperative multi-point (CoMP)-MU-MIMO communication, and the like. For example, in an SU-MIMO communication system, a single receiver has multiple antennas and uses the antennas to receive data that is transmitted from the multiple antennas of a transmitter. Thus, it is possible to achieve advantages, such as an increase in the data communication capacity and an improvement in the reception quality.

In the MIMO communication system, if the number of antennas used is increased, a large amount of data is transmitted and received to perform a process. As a result, the size, cost, and power consumption of circuits, or the like, connected to the antennas are increased, and the complexity of the overall MIMO communication system is also increased.

In an MU-MIMO communication system, or the like, where data is concurrently transmitted to multiple receivers that each include one or more antennas, it is desirable to perform a task of selecting or scheduling the antennas of a transmitter and a receiver (i.e., a user) that transmit and receive data to and from each other.

For example, Japanese Laid-open Patent Publication No. 2009-159377 discloses a technology for selecting a pair of transmitting and receiving antennas to be used from all the antennas so that the cost, complexity, power consumption, and the like, can be reduced.

As the complexity of an MIMO communication system is increased, the number of pairs of transmitting and receiving antennas becomes enormous. Even if the conventional method is used to select transmitting and receiving antennas, as disclosed in the above document, there is a technical problem in that a huge amount of processing time is required to select the optimum pair of antennas because of the increase in the number of pairs of antennas.

There is a conventional method for selecting a pair of antennas in which an inverse matrix is calculated from the matrix of a transmitting and receiving antenna set and the inverse matrix is used as a selection criterion. As the number of pairs of antennas is increased, the complexity of the calculation of the inverse matrix is increased, which results in an increase in the above-described processing time.

SUMMARY

According to an aspect of an embodiment of the invention, a wireless communication system that performs multiple-input multiple-output communication between a first wireless communication apparatus with a plurality of antennas and a second wireless communication apparatus with a plurality of antennas, at least any one of the first and second wireless communication apparatuses includes: a first selecting unit that selects, from first group of pairs of an antenna of the first wireless communication apparatus and an antenna of the second wireless communication apparatus, one pair for which the gain of a transmitted and received signal on a transmission path is largest; a second selecting unit that calculates inverse matrices based on channel matrices with respect to second group of pairs of an unselected antenna of the antennas of the first wireless communication apparatus and an unselected antenna of the second wireless communication apparatus and that selects a pair from the second group on the basis of the calculated inverse matrices; and a communication unit that performs multiple-input multiple-output communication by using the selected antennas, wherein the second selecting unit continues to calculate the inverse matrices and continues to select a pair from the second group until a predetermined number of antennas of the first wireless communication apparatus and the second wireless communication apparatus have been selected.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Preferred embodiments of the present invention will be explained with reference to accompanying drawings.

(1) Wireless Communication System

Figure 1:
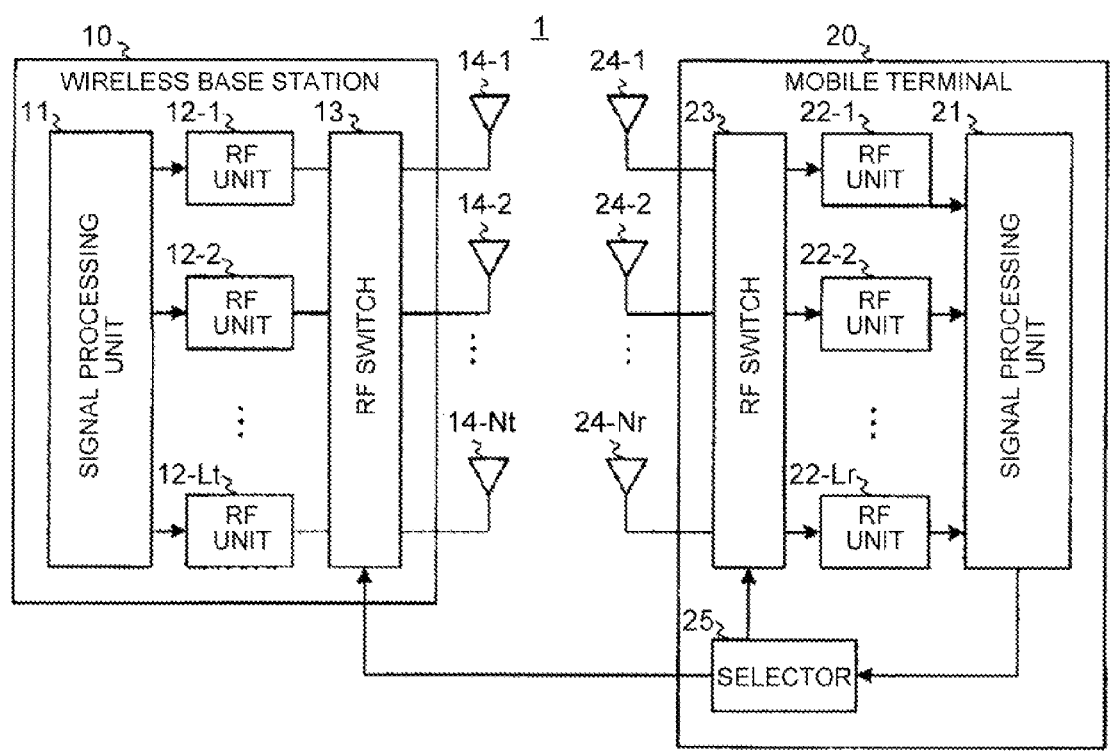
FIG. 1 is a block diagram that illustrates an exemplary configuration of a wireless communication system that performs SU-MIMO communication.

An explanation is given, with reference to FIG. 1, of an exemplary basic configuration of a multiple-input multiple-output (MIMO) wireless communication system 1 according to the present embodiment. FIG. 1 is a block diagram that illustrates an exemplary basic configuration of the MIMO wireless communication system 1 according to the present embodiment.

As illustrated in FIG. 1, the MIMO wireless communication system 1 according to the present embodiment is an SU-MIMO wireless communication system that includes a wireless base station 10 and a mobile terminal 20. The wireless base station 10 and the mobile terminal 20 each have multiple antennas. The wireless base station 10 and the mobile terminal 20 transmit and receive data to and from each other via the antennas so as to perform MIMO wireless communication.

In the MIMO wireless communication system 1, the wireless base station 10 is a transmitter and the mobile terminal 20 is a receiver for a downstream link. Conversely, the wireless base station 10 is a receiver and the mobile terminal 20 is a transmitter for an upstream link. In the example illustrated in FIG. 1, an explanation is given with a focus on data transmission from the wireless base station 10 to the mobile terminal 20 on a downstream link.

In the preferred embodiment, the wireless base station 10 may be used as, for example, a wireless base station (e.g., Node B (NB) or evolved NodeB (eNodeB)) in a mobile-phone system or mobile communication system or it may be used as an access point in a wireless LAN system. Accordingly, in the preferred embodiment, the mobile terminal 20 may be used as, for example, a mobile phone in a mobile-phone system or a client (e.g., personal computer) in a wireless LAN system.

The wireless base station 10 includes a signal processing unit 11; RF units 12 (i.e., RF units 12-1 to 12-Lt), the number of which is Lt (Lt is an integer greater than or equal to 2); an RF switch 13; and antennas 14 (i.e., antennas 14-1 to 14-Nt), the number of which is Nt.

The signal processing unit 11 receives data that is to be transmitted to the mobile terminal 20, performs an encoding process or signal process on the data, and inputs the data to the RF units 12-1 to 12-Lt.

The RF units 12-1 to 12-Lt perform a wireless transmission process on the data, which is divided between them. Each of the RF units 12-1 to 12-Lt is connected to any one of the antennas 14-1 to 14-Nt via the RF switch 13. Each of the antennas 14-1 to 14-Nt transmits, to the mobile terminal 20, the data that has been subjected to the wireless transmission process by one of the RF units 12-1 to 12-Lt that is connected to one of the antennas 14-1 to 14-Nt.

The RF switch 13 can switch on/off the connections between the RF units 12-1 to 12-Lt and the antennas 14-1 to 14-Nt. The RF switch 13 selects a predetermined number of antennas from the antennas 14-1 to 14-Nt, which transmit data that has been subjected to the wireless transmission process by the RF units 12-1 to 12-Lt, so as to output the data in parallel.

More specifically, the RF switch 13 switches on the connections of the predetermined number of antennas, which have been selected from the Nt antennas 14-1 to 14-Nt included in the wireless base station 10, so that the antennas transmit data that has been subjected to the wireless transmission process by the RF units 12-1 to 12-Lt. The RF switch 13 selects an antenna that is to transmit data, for example, in accordance with an antenna selection result received from a selector 25, which will be explained later, of the mobile terminal 20.

The data divided by the RF switch 13 is transmitted to the mobile terminal 20 via the antennas 14-1 to 14-Nt.

The mobile terminal 20 includes a signal processing unit 21; RF units 22 (i.e., RF units 22-1 to 22-Lr), the number of which is Lr (Lr is an integer greater than or equal to 2); an RF switch 23; antennas 24 (i.e., antennas 24-1 to 24-Nr), the number of which is Nr; and the selector 25.

The mobile terminal 20 receives data from the wireless base station 10 via the antennas 24-1 to 24-Nr. Each of the antennas 24-1 to 24-Nr is connected to any one of the RF units 22-1 to 22-Lr via the RF switch 23. Each of the RF units 22-1 to 22-Lr performs a wireless reception process on the data, which is received by one of the connected antennas 24-1 to 24-Nr, and then inputs the processed data to the signal processing unit 21.

The RF switch 23 can switch on/off the connections between the antennas 24-1 to 24-Nr and the RF units 22-1 to 22-Lr. The RF switch 23 selects the connections between the RF units 22-1 to 22-Lr, which performs a wireless reception process, and the antennas 24-1 to 24-Nr so that some of the antennas 24-1 to 24-Nr receive predetermined data. The RF switch 23 selects an antenna that receives data in accordance with an antenna selection result received from the selector 25.

The signal processing unit 21 receives signals, which have been received from the wireless base station 10 and subjected to the wireless reception process by the RF units 22-1 to 22-Lr, performs a decoding process or signal process on the signals so as to generate data, and inputs the data to a processing circuit, or the like, included in the mobile terminal 20.

By using the data detected by the signal processing unit 21, the selector 25 selects a pair of transmitting and receiving antennas that are to be used for MIMO wireless communication between the wireless base station 10 and the mobile terminal 20 and then notifies the RF switch 13 of the wireless base station 10 of the antenna selection result and notifies the RF switch 23 of the mobile terminal 20 of the antenna selection result.

(2) First Operation Example

Figure 2:
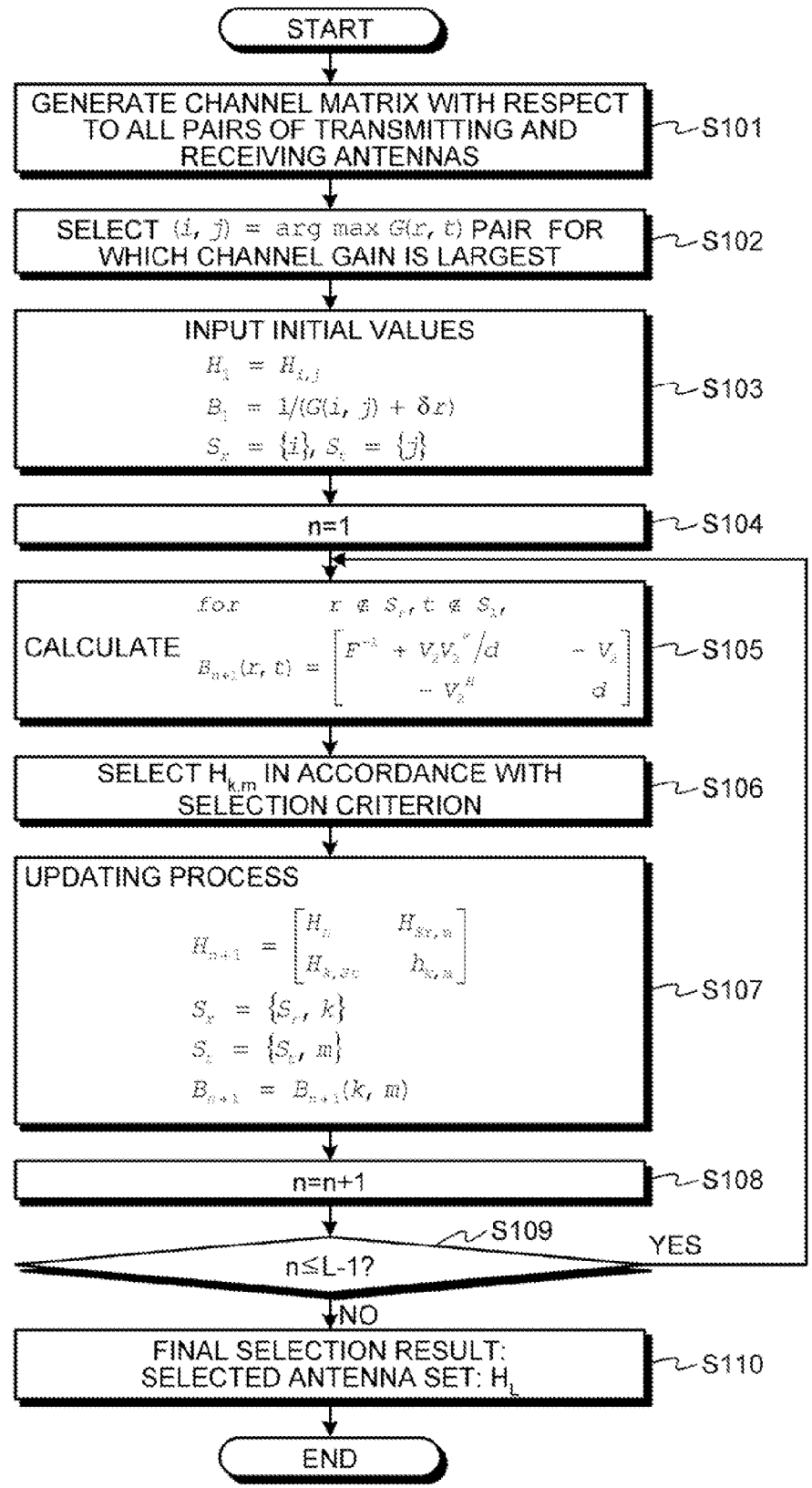
FIG. 2 is a flowchart that illustrates the flow of a first operation example.

An explanation is given, with reference to FIG. 2, of the flow of an antenna selection operation performed by the above-described MIMO wireless communication system 1. During the antenna selection operation, when data is transmitted, a predetermined number of pairs of antennas, which transmit and receive data, are selected by the operation of the selector 25 included in the mobile terminal 20. The pairs of antennas are made up of a combination of any one of the antennas 14-1 to 14-Nt and any one of the antennas 24-1 to 24-Nr. In other words, during the antenna selection operation, a predetermined number of transmitting antennas are selected from the antennas 14-1 to 14-Nt included in the wireless base station 10 on the transmitting side and, in order to correspond to the transmitting antennas, the predetermined number of receiving antennas are selected from the antennas 24-1 to 24-Nr included in the mobile terminal 20 on the receiving side.

FIG. 2 is a flowchart that illustrates the flow of the antenna selection operation.

As illustrated in FIG. 2, the selector 25 of the mobile terminal 20 acquires the channel gain of the path between each of the transmitting antennas 14-1 to 14-Nt included in the wireless base station 10 and each of the receiving antennas 24-1 to 24-Nr included in the mobile terminal 20 during transmission.

Specifically, the selector 25 individually acquires channel gains, each channel gain being that of the path that is used when each of the antennas 24-1 to 24-Nr receives a signal that is transmitted by each of the antennas 14-1 to 14-Nt. The selector 25 stores the acquired channel gains in the form of the channel matrix H, which is denoted by the following Equation (1) (Step S101).

$$H = \begin{pmatrix} h_{1,1} & \cdots & h_{1,N_t} \\ \vdots & \ddots & \vdots \\ h_{Nr,1} & \cdots & h_{N_r,N_t} \end{pmatrix} \quad (1)$$

The channel matrix H contains the channel gain values $h_{r,t}$ with respect to all the pairs, each including a transmitting antenna t from among the antennas 14-1 to 14-Nt included in the wireless base station 10 and a receiving antenna r from among the antennas 24-1 to 24-Nr included in the mobile terminal 20.

The selector 25 then detects the pair (i, j), for which the channel gain is largest, among all the channel gains $h_{r,t}$ contained in the channel matrix H (Step S102). Specifically, the pair of antennas (i, j), for which the channel gain is largest, is detected on the basis of the following Equation (2). That is, the selector 25 detects the pair (i, j) that satisfies the following Equation (2) (Step S102).

$$(i,j) = \arg\max G(r,t)$$

$$r \in (1 \ldots N_r), t \in (1 \ldots N_t) \quad (2)$$

$$G(r,t) = |H_{r,t}|^2$$

The selector 25 then discriminates between the selected pair of transmitting and receiving antennas (i, j) and unselected antennas. For example, the selector 25 extracts information for identifying a selected antenna (e.g., an ID number assigned to each antenna for convenience) so as to create a set $S_t$ of selected transmitting antennas and a set $S_r$ of selected receiving antennas. When j is selected as a transmitting antenna and as a receiving antenna, the selected receiving-antenna set is $S_r = \{i\}$ and the selected transmitting-antenna set is $S_t = \{j\}$.

In accordance with the selected pair (i, j) for which the channel gain is largest, the selector 25 inputs the initial values into the channel matrix $H_n$, which corresponds to a selected pair of transmitting and receiving antennas, and the inverse matrix $B_n$ of the channel matrix $H_n$ (Step S103).

$H_n$ is the channel matrix corresponding to a selected pair of transmitting and receiving antennas, and $B_n$ is the inverse matrix related to the channel matrix $H_n$. Hereafter, $H_n$ is defined as a selected channel matrix to discriminate it from the channel matrix H.

In the first operation example of the antenna selection operation, each time a new pair of transmitting and receiving antennas is selected (in other words, a new pair is added to the set of selected pairs of antennas), $H_n$ and $B_n$ are updated by adding thereto the channel gain information on the selected new pair of antennas. Thus, n pairs of transmitting and receiving antennas are selected during the antenna paring process that is performed n number of times, and the channel matrix $H_n$ becomes an n-dimensional channel matrix.

If the pair (i, j), for which the channel gain is largest, is selected from the channel matrix H, the initial value of the selected channel matrix $H_1$ is denoted by the following Equation (3).

$$H_1 = H_{i,j} \quad (3)$$

The inverse matrix $B_n$ is calculated from the selected channel matrix $H_n$ as denoted by the following Equation (4).

$$B_n = (H_n^H H_n \delta \gamma I_n)^{-1} \quad (4)$$

Here, δ is an element that defines the presence or absence of noise related to a pair of transmitting and receiving antennas, and γ is a noise component, for example, a signal-to-noise ratio. For example, if a linear decoder with the minimum mean-square-error (MMSE) criterion is used for the receiving function of the mobile terminal 20, the noise component is added because δ=1. Conversely, if the mobile terminal 20 uses a linear decoder that uses an equalization algorithm with a zero forcing (ZF) criterion, the noise interference component is removed because δ=0. Furthermore, $H_n^H$ denotes the Hermitian transposition of the selected channel matrix $H_n$, $X^{-1}$ denotes the generalized inverse matrix of the matrix X, and $I_n$ denotes an n-dimensional identity matrix.

The following Equation (5) denotes the initial value $B_1$ of the inverse matrix $B_n$ that is obtained when the pair (i, j) is selected on the basis of Equations (2), (3), and 4.

$$B_1 = (G(i,j) + \delta\gamma)^{-1} \quad (5)$$

Because one pair of transmitting and receiving antennas (i, j) has been selected by the above-described processes, the selector 25 sets the counter variable to 1 (Step S104).

Next, in order to select the second pair of transmitting and receiving antennas, the selector 25 updates the inverse matrix $B_1$ with respect to all the pairs (r, t) of the receiving antennas r that have not been selected (i.e., not included in Sr) and the transmitting antennas t that have not been selected (i.e., not included in St) (Step S105). Specifically, the selector 25 calculates the updated inverse matrix $B_{n+1}$ (in this case, $B_2$) from the inverse matrix $B_n$ (in this case, $B_1$) by using Equation (6) with respect to all the pairs of transmitting and receiving antennas (r, t). In other words, the selector 25 calculates the inverse matrix $B_2$ with respect to all the selected channel matrices $H_2$ that can be theoretically obtained when one pair of unselected transmitting and receiving antennas is added to the selected channel matrix $H_1$.

$$\text{for } r \notin S_r, \quad (6)$$
$$t \notin S_t,$$
$$B_{n+1}(r,t) = \begin{bmatrix} F^{-1} + v_2 v_2^H / d & -v_2 \\ -v_2^H & d \end{bmatrix}$$

F, $v_2$, and d described in Equation (6) are defined by Equations (7) to (12).

$$u = H_n^H a_{n+1} + b_{n+1}^H h_{r,t} \quad (7)$$

$$g = a_{n+1}^H a_{n+1} + h_{r,t}^H h_{r,t} + \delta\gamma \quad (8)$$

$$F = B_n^{-1} + b_{n+1}^H b_{n+1} \quad (9)$$

-continued $$v_1 = F^{-1}u = \left(B_n - \frac{B_n b_{n+1}^H b_{n+1} B_n}{1 + b_{n+1} B_n b_{n+1}^H}\right)u \quad (10)$$

$$d = \frac{1}{g - u^H v_1} \quad (11)$$

$$v_2 = v_1 d \quad (12)$$

Furthermore, "$a_{n+1}$" is "$H_{Sr, t}$", which is an n×1 column vector, and "$b_{n+1}$" is "$H_{r, St}$", which is a 1×n row vector.

The selector 25 updates the inverse matrix so as to calculate the two-dimensional inverse matrix $B_2$ with respect to all the pairs of unselected transmitting and receiving antennas. The selector 25 then applies a predetermined criterion to the inverse matrix $B_2$ so as to select the second pair of transmitting and receiving antennas (k, m) (Step S106). Here, k denotes the second (i.e., subsequent to i) selected receiving antenna, and m denotes the second (i.e., subsequent to j) selected transmitting antenna corresponding to the receiving antenna k. A detailed explanation is given later of an operation for selecting a pair of transmitting and receiving antennas.

The selector 25 then updates the selected channel matrix $H_1$ in accordance with the added new transmitting and receiving antennas (k, m) so as to calculate a two-dimensional channel matrix $H_2$ (Step S107).

The updated selected channel matrix $H_{n+1}$ is obtained by using Equation (13) that is based on the pre-update selected channel matrix $H_n$, an n-dimensional column vector $H_{Sr, m}$, an n-dimensional row vector $H_{k, St}$, and the channel gain $h_{k, m}$ of the selected new transmitting and receiving antennas (k, m).

$$H_{n+1} = \begin{pmatrix} H_n & H_{Sr,m} \\ H_{k,St} & h_{k,m} \end{pmatrix} \quad (13)$$

Here, $H_{Sr, m}$ is an n-dimensional column vector that contains, as an element, the channel gain that is obtained between the selected new transmitting antenna m and each receiving antenna r included in the selected receiving-antenna set $S_r$. Furthermore, $H_{k, St}$ is an n-dimensional row vector that contains, as an element, the channel gain that is obtained between each transmitting antenna t included in the selected transmitting-antenna set $S_t$ and the selected new receiving antenna k.

Furthermore, the selector 25 adds the selected transmitting and receiving antennas (k, m) to the selected receiving-antenna set $S_r$ and the selected transmitting-antenna set $S_t$. If the selected receiving-antenna set and the selected transmitting-antenna set, to which the selected transmitting and receiving antennas (k, m) have been added (in other words, the updated sets), are $S_r$ and $S_t$, then the selected receiving-antenna set is $S_r=\{S_r, k\}$ and the selected transmitting-antenna set is $S_t=\{S_t, m\}$. In the example illustrated in FIG. 2, the selected receiving-antenna set is $S_r=\{i, k\}$, and the selected transmitting-antenna set is $S_t=\{j, m\}$.

The selector 25 sets $B_2$ (k, m) as the updated inverse matrix $B_2$.

Then, the selector 25 increments the counter variable n by 1 (Step S108). Afterwards, the selector 25 determines whether the counter variable n is lower than or equal to the value that is obtained by subtracting one from the number L of pairs of selectable transmitting and receiving antennas (Step S109).

If the result of the determination at Step S109 is that the counter variable n is lower than or equal to L−1 (Yes at Step S109), the selector 25 repeats the process from Steps S105 to S108 until the counter variable n becomes L−1. Specifically, the selector 25 repeats the following process: updates the inverse matrix $B_{n+1}$ in accordance with the value of the incremented counter variable n so as to select a new pair of transmitting and receiving antennas (k, m); and updates the selected channel matrix $H_{n+1}$ and the inverse matrix $B_{n+1}$ in accordance with the selected pair of transmitting and receiving antennas (k, m).

Conversely, if the result of the determination at Step S109 is that the counter variable n is not lower than or equal to L−1 (No at Step S109), the selector 25 contains an L-dimensional selected channel matrix $H_L$ with respect to the transmitting and receiving antennas selected at Steps S102 and S106. The selector 25 then designates the transmitting and receiving antennas included in the selected channel matrix $H_L$ as the antennas to be used for communication between the wireless base station 10 and the mobile terminal 20 in the wireless communication system 1 (Step S110).

In other words, the selector 25 gives an instruction to the RF switch 13 of the wireless base station 10 so that the transmitting antennas 14 that have not been selected at Steps S102 and S106 will not transmit data. Furthermore, the selector 25 gives an instruction to the RF switch 23 of the mobile terminal 20 so that the receiving antennas 24 that have not been selected at Steps S102 and S106 will not be used for receiving data.

In the above-described first operation example, an explanation is given of a case where, in the MIMO wireless communication system 1 that performs SU-MIMO communication, the selector 25 included in the mobile terminal 20 on the receiving side selects transmitting and receiving antennas. If a component that corresponds to the selector 25 is installed in the wireless base station 10, the wireless base station 10 on the transmitting side may select transmitting and receiving antennas. In such a case, the wireless base station 10 may get feedback on the values of channel gains, each value being that of the channel gain of the path used by an individual pair of transmitting and receiving antennas, and then select transmitting and receiving antennas in accordance with the value of the channel gain.

(3) Selection of Antenna in Accordance with Criteria

An explanation is given of criteria that are used when the next pair of transmitting and receiving antennas is selected on the basis of the updated inverse matrix $B_{n+1}$ at Step S106 in the above-described first operation example. The criteria represent a parameter and a condition of the parameter that are used as criteria when a pair of transmitting and receiving antennas is selected in accordance with the updated inverse matrix $B_{n+1}$ (r, t) that is calculated with respect to a pair of transmitting and receiving antennas (r, t) that can be selected next (in other words, all the pairs of an unselected transmitting antenna and an unselected receiving antenna). The selector 25 may select a suitable criterion as appropriate from multiple criteria described below in accordance with a situation or an instruction received from an administrator of the wireless communication system 1.

According to one of the criteria, the selector 25 may select, as the pair of transmitting and receiving antennas (k, m), a pair of transmitting and receiving antennas (r, t) for which the element value of the last diagonal element is smallest (i.e., the signal to noise plus interference ratio is largest when the pair of antennas is added) among multiple updated inverse matrices $B_{n+1}$ (r, t).

According to another of the criteria, the selector 25 may select, as the pair of transmitting and receiving antennas (k, m), a pair of transmitting and receiving antennas (r, t) for which the sum of the diagonal elements, i.e., mean squared error is smallest among multiple updated inverse matrices $B_{n+1}$ (r, t).

According to another of the criteria, the selector 25 may select, as the pair of transmitting and receiving antennas (k, m), a pair of transmitting and receiving antennas (r, t) for which the product of the diagonal elements, i.e., the reciprocal of the product of the signal-to-noise ratios is smallest among multiple updated inverse matrices $B_{n+1}$ (r, t).

According to another of the criteria, the selector 25 may select, as the pair of transmitting and receiving antennas (k, m), a pair of transmitting and receiving antennas (r, t) for which the value obtained by summing the inverted element value of each diagonal element, i.e., the sum of the signal-to-noise ratios is largest among multiple updated inverse matrices $B_{n+1}$ (r, t).

According to another of the criteria, the selector 25 may select, as the pair of transmitting and receiving antennas (k, m), a pair of transmitting and receiving antennas (r, t) for which the largest value of the element values of the diagonal elements, i.e., block error rate (BER) is smallest among multiple updated inverse matrices $B_{n+1}$ (r, t).

If there are any other suitable criteria, the selector 25 may use the criteria as appropriate.

(4) Exemplary Embodiment

Figure 3:
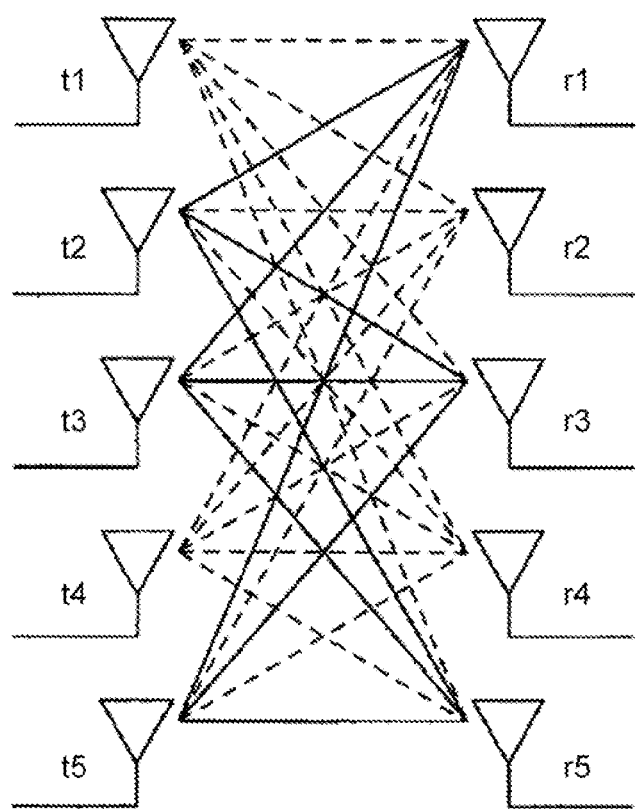
FIG. 3 is a diagram that illustrates the relation between transmitting and receiving antennas according to an embodiment.

An explanation is given of a specific example of the antenna selection operation performed if three pairs of transmitting and receiving antennas are selected from transmitting antennas t1 to t5 and receiving antennas r1 to r5 (i.e., if Nt=5, Nr=5, and L=3), as illustrated in FIG. 3.

First, the selector 25 acquires the channel gain of a path with respect to all the pairs of any one of the transmitting antenna set {t1 to t5} and any one of the receiving antenna set {r1 to r5} so as to obtain the channel matrices H of all the channels. The channel matrix H may be stored before the start of the antenna selection operation by measuring the value of the channel gain of each path in advance.

Then, the selector 25 uses the channel matrix to select a pair (i, j), for which the channel gain of its path is largest, from the transmitting antenna set {t1 to t5} and the receiving antenna set {r1 to r5}. In this explanation, it is assumed that the transmitting antenna t2 and the receiving antenna r3 are selected.

In accordance with the selected pair of transmitting and receiving antennas, the selector 25 sets the initial values of the selected channel matrix $H_1$, the inverse matrix $B_1$, the receiving antenna set $S_r$, and the transmitting antenna set $S_t$. According to the present embodiment, the initial values are set such that the selected channel matrix is $H_1=h_{3,2}$, the receiving antenna set is $S_r=\{r3\}$, and the transmitting antenna set is $S_t=\{t2\}$.

The unselected transmitting antenna set is {t1, t3, t4, t5}, and the unselected receiving antenna set is {r1, r2, r4, r5}. The selector 25 then selects the second pair of transmitting and receiving antennas (r, t) from the unselected transmitting antenna set and the unselected receiving antenna set and adds the second pair to the selected channel matrix $H_1$ so as to calculate the inverse matrix $B_2$ (r, t) of the selected channel matrix $H_2$ that is obtained when each pair of transmitting and receiving antennas is added.

The selector 25 calculates 16 inverse matrices $B_2$ (r, t) with respect to 16 pairs of unselected transmitting and receiving antennas, i.e., (r1, t1), (r1, t3), (r1, t4), (r1, t5), (r2, t1), (r2, t3), (r2, t4), (r2, t5), (r4, t1), (r4, t3), (r4, t4), (r4, t5), (r5, t1), (r5, t3), (r5, t4), (r5, t5).

The selector 25 selects a pair of transmitting and receiving antennas (k, m) from the calculated 16 inverse matrices $B_2$ (r, t) in accordance with an arbitrary criterion. In this explanation, it is assumed that the transmitting antenna t3 and the receiving antenna r5 are selected.

The selector 25 adds the selected pair of transmitting and receiving antennas (r5, t3) to the selected channel matrix $H_1$ so as to calculate a two-dimensional selected channel matrix $H_2$. Furthermore, the selector 25 updates the inverse matrix so as to set the inverse matrix $B_2$ (r5, t3), which has been calculated during the above-described process, as the two-dimensional inverse matrix $B_2$. The selector 25 updates the receiving antenna set and the transmitting antenna set so that the receiving antenna set is $S_r=\{r3, r5\}$ and the transmitting antenna set is $S_t=\{t2, t3\}$.

The unselected transmitting antenna set is {t1, t4, t5}, and the unselected receiving antenna set is {r1, r2, r4}. The selector 25 then selects the third pair of transmitting and receiving antennas (r, t) from the unselected transmitting antenna set and the unselected receiving antenna set and adds the selected pair to the selected channel matrix $H_2$ so as to calculate the inverse matrix $B_3$ (r, t) of the selected channel matrix $H_3$, which is obtained when each pair of transmitting and receiving antennas is added.

The selector 25 calculates 9 inverse matrices $B_3$ (r, t) with respect to 9 pairs of unselected transmitting and receiving antennas, i.e., (r1, t1), (r1, t4), (r1, t5), (r2, t1), (r2, t4), (r2, t5), (r4, t1), (r4, t4), (r4, t5).

The selector 25 selects a pair of transmitting and receiving antennas (k, m) from the calculated 9 inverse matrices $B_3$ (r, t) in accordance with an arbitrary criterion. In this explanation, it is assumed that the transmitting antenna t5 and the receiving antenna r1 are selected.

The selector 25 adds the selected pair of transmitting and receiving antennas (r1, t5) to the selected channel matrix $H_2$ so as to calculate a three-dimensional selected channel matrix $H_3$. Furthermore, the selector 25 updates the inverse matrix so as to set the inverse matrix $B_3$ (r1, t5), which has been calculated during the above-described process, as the three-dimensional inverse matrix $B_3$. The selector 25 updates the receiving antenna set and the transmitting antenna set so that the receiving antenna set is $S_r=\{r1, r3, r5\}$ and the transmitting antenna set is $S_t=\{t2, t3, t5\}$.

The selector 25 transmits the selected transmitting antenna set $S_t=\{t2, t3, t5\}$ to the RF switch 13 of the wireless base station 10. Furthermore, the selector 25 transmits the selected receiving antenna set $S_r=\{r1, r3, r5\}$ to the RF switch 23 of the mobile terminal 20.

The wireless base station 10 uses the notified transmitting antenna set $S_t=\{t2, t3, t5\}$ to transmit data to the mobile terminal 20. The mobile terminal 20 uses the notified receiving antenna set $S_r=\{r1, r3, r5\}$ to receive the data. There is a possibility that the transmission efficiency, such as the channel gain, of the path between the transmitting antenna and the receiving antenna that have been selected as a pair is more deteriorated than that of a path between an unselected pair of antennas. However, the overall transmission efficiency of the selected transmitting antenna set $S_t=\{t2, t3, t5\}$ and the selected receiving antenna set $S_r=\{r1, r3, r5\}$ is the most appropriate.

In the above-described embodiment, the calculation operation is performed a total of 50 times, i.e., 5×5 times to select a pair of transmitting and receiving antennas, for which the channel gain is largest, from all the pairs; 4×4 times to select the second pair on the basis of the inverse matrix $B_2$; and 3×3 times to select the third pair on the basis of the inverse matrix $B_3$. Specifically, if the number of transmitting antennas is Nt and the number of receiving antennas is Nr, L pairs of transmitting and receiving antennas are selected by performing the calculation operation a number of times, i.e., (Nt×Nr)+((Nt−1)×(Nr−1))+((Nt−2)×(Nr−2))+ . . . +((Nt−(L−1))×(Nr−(L−1))).

In a conventional method, i.e., a method that is not according to the operation example of the disclosed MIMO wireless communication system 1, the inverse matrix or the determinant of the inverse matrix are calculated with respect to all L pairs of transmitting and receiving antennas, which can be obtained from all the transmitting and receiving antennas, and the optimum pair of transmitting and receiving antennas is selected from L pairs on the basis of the calculated value. If the number of transmitting antennas is Nt and the number of receiving antennas is Nr, the calculation operation needs to be performed a number of times, i.e., (Nt!/(L!×(Nt−L)!)×(Nr!/(L!×(Nr−L)!) so as to select L pairs of transmitting and receiving antennas. In the above-described embodiment, if the transmitting and receiving antennas are selected using the above method, the calculation operation needs to be performed (5!/(3!×2!)×(5!/(3!×2!))=10×10=100 times.

Therefore, in the above-described embodiment, an optimum set of transmitting/receiving antennas can be selected during the calculation operation a fewer number of times than in the conventional method. Furthermore, the efficiency obtained due to the decrease in the number of times the calculation operation is performed during the antenna selection operation according to the present embodiment compared to that of the conventional method is increased as the number of antennas is increased. Thus, this is more advantageous for large-scale MIMO communication that uses a large number of transmitting and receiving antennas.

(5) Second Operation Example

Figure 4:
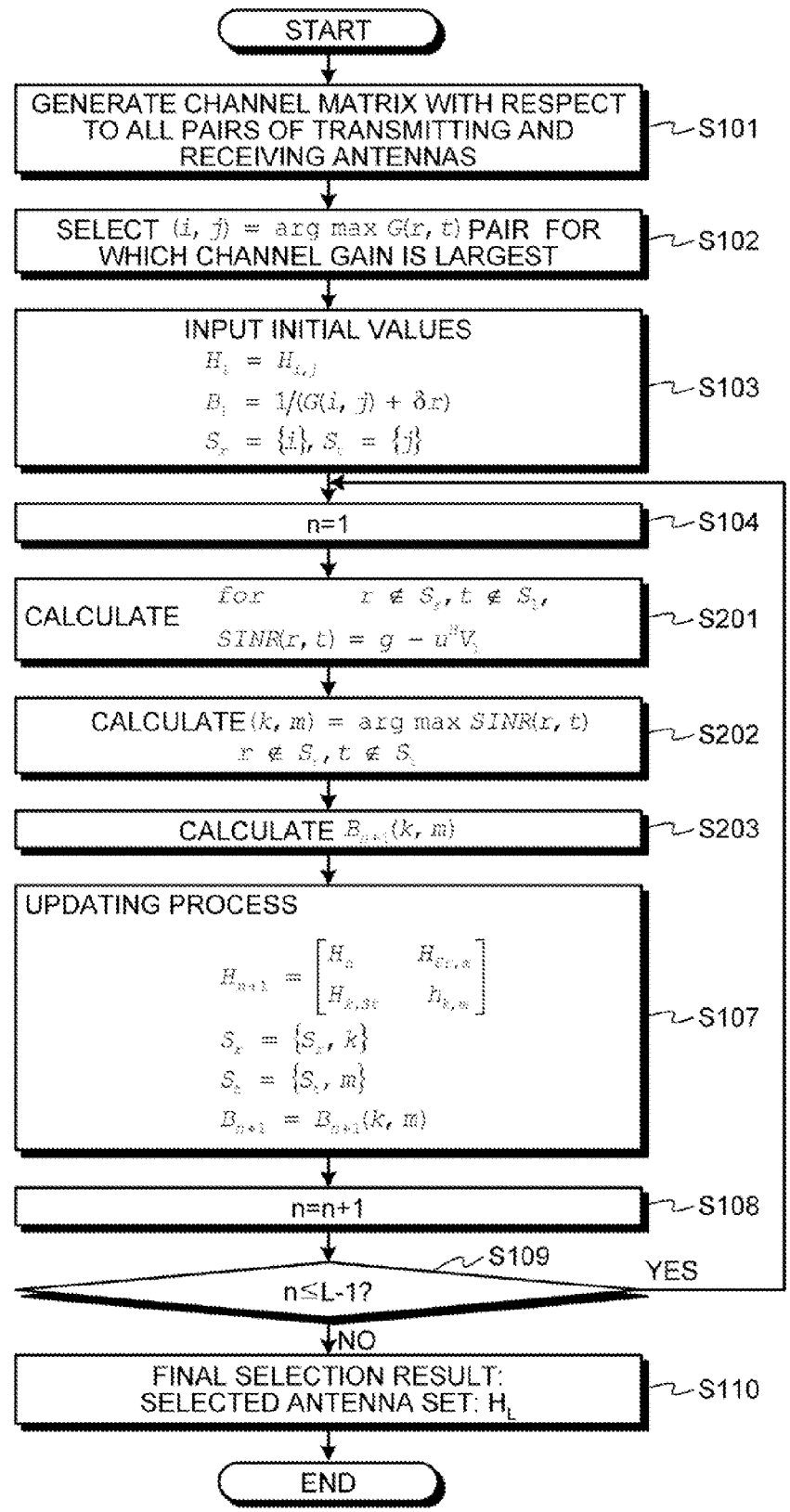
FIG. 4 is a flowchart that illustrates the flow of a second operation example.

An explanation is given, with reference to FIG. 4, of the flow of a second operation example of the antenna selection operation. FIG. 4 is a flowchart that illustrates the flow of the second operation example of the antenna selection operation. In FIG. 4, the same operations as those in the first operation example are denoted by the same numbers as those in FIG. 2, and the explanations for those operations may be omitted below.

As illustrated in FIG. 4, according to the second operation example, in the same manner as the first operation example, the selector 25 stores the channel gain of a path in the form of the channel matrix H with respect to all the pairs of transmitting and receiving antennas (Step S101).

The selector 25 then detects the pair (i, j), for which the channel gain is largest, from among all the channel gains $h_{rt}$ contained in the channel matrix H so as to select the first pair of transmitting and receiving antennas (Step S102).

In accordance with the selected pair of transmitting and receiving antennas (i, j), the selector 25 sets the initial values of the selected receiving antenna set $S_r$, the selected transmitting antenna set $S_t$, the selected channel matrix $H_1$, and the inverse matrix $B_1$ (Step S103). Afterwards, the selector 25 sets the counter variable n to 1 (Step S104).

Next, in order to select the second pair of transmitting and receiving antennas, the selector 25 calculates SINR (r, t) with respect to all the pairs (r, t) of the receiving antennas r that have not been selected (i.e., not included in $S_r$) and the transmitting antennas t that have not been selected (i.e., not included in $S_t$) (Step S201). The signal to noise plus interference ratio SINR (r, t) is calculated by using the following Equation (14).

$$\text{SINR}(r,t)=g-u^H v_1 \qquad (14)$$

In other words, the selector 25 calculates the signal to noise plus interference ratio SINR (r, t) with respect to all the selected channel matrices $H_2$ that can be theoretically obtained when one pair of unselected transmitting and receiving antennas is added to the selected channel matrix H. As described above, g, u, and $v_1$ described in Equation (14) have been defined.

After calculating the signal to noise plus interference ratio SINR (r, t) with respect to all the pairs of unselected transmitting and receiving antennas, the selector 25 selects a pair of transmitting and receiving antennas, for which the signal to noise plus interference ratio SINR (r, t) is largest, as the second pair of transmitting and receiving antennas (k, m) (Step S202). Specifically, the selector 25 selects the pair of transmitting and receiving antennas (r, t), which satisfies the condition defined by the following Equation (15), as the second pair of transmitting and receiving antennas (k, m).

$$(k,m)=\arg \max \text{SINR}(r,t) r \notin S_r, t \notin S_t \qquad (15)$$

The selector 25 then calculates the inverse matrix $B_2$ (k, m) with respect to the theoretical selected channel matrix $H_2$ that is obtained by adding the selected second pair of transmitting and receiving antennas (k, m) to the selected channel matrix $H_1$ (Step S203). Then, the selector 25 updates the selected channel matrix $H_1$ in accordance with the added new transmitting and receiving antennas (k, m) so as to calculate a two-dimensional channel matrix $H_2$ (Step S107). Furthermore, the selector 25 adds the selected transmitting and receiving antennas (k, m) to the selected receiving-antenna set $S_r$ and the selected transmitting-antenna set $S_t$. The selector 25 sets $B_2$ (k, m) as the updated inverse matrix $B_2$.

The selector 25 then increments the counter variable n by 1 (step S108). Afterwards, the selector 25 determines whether the counter variable n is lower than or equal to the value that is obtained by subtracting one from the number L of pairs of selectable transmitting and receiving antennas (Step S109).

If the result of the determination at Step S109 is that the counter variable n is lower than or equal to L−1 (Yes at Step S109), the selector 25 repeats the process from Steps S201 to S108 until the counter variable n becomes L−1. Specifically, the selector 25 repeats the following process: calculates the signal to noise plus interference ratio SINR (r, t) in accordance with the incremented value of the counter variable n, and selects a pair of transmitting and receiving antennas (k, m), for which the signal to noise plus interference ratio SINR (r, t) is largest.

Conversely, if the result of the determination at Step S109 is that the counter variable n is not lower than or not equal to L−1 (No at Step S109), the selector 25 contains an L-dimensional selected channel matrix $H_L$ with respect to the transmitting and receiving antennas selected at Steps S102 and S106. The selector 25 designates the transmitting and receiving antennas contained in the selected channel matrix $H_L$ as the antennas to be used for communication between the wireless base station 10 and the mobile terminal 20 in the wireless communication system 1 (Step S110).

In the above-described second operation example, in contrast to the first operation example, the process for updating the inverse matrix $B_n$ is not performed on all the pairs of unselected transmitting and receiving antennas. The transmitting and receiving antennas are selected on the basis of the signal to noise plus interference ratio SINR (r, t). Thus, the calculation operation, which is necessary for the process for updating the inverse matrix $B_n$, is performed a smaller number of times so that the complexity of the calculation operation during the antenna selection operation can be decreased. The second operation example is particularly advantageous when transmitting and receiving antennas are selected on the basis of the largest value of the signal to noise plus interference ratio SINR (r, t).

(6) Modified Example

In the example illustrated in FIG. 1, the MIMO wireless communication system 1 is an SU-MIMO wireless communication system in which a receiver is the mobile terminal 20 with multiple antennas. The above-described embodiments can be applied to not only the above example but also an MU-MIMO wireless communication system, CoMP-MU-MIMO wireless communication system, and MIMO ad hoc multihop wireless communication system.

An explanation is given of modified examples of a wireless communication system with reference to the attached drawings.

(6-1) First Modified Example

Figure 5:
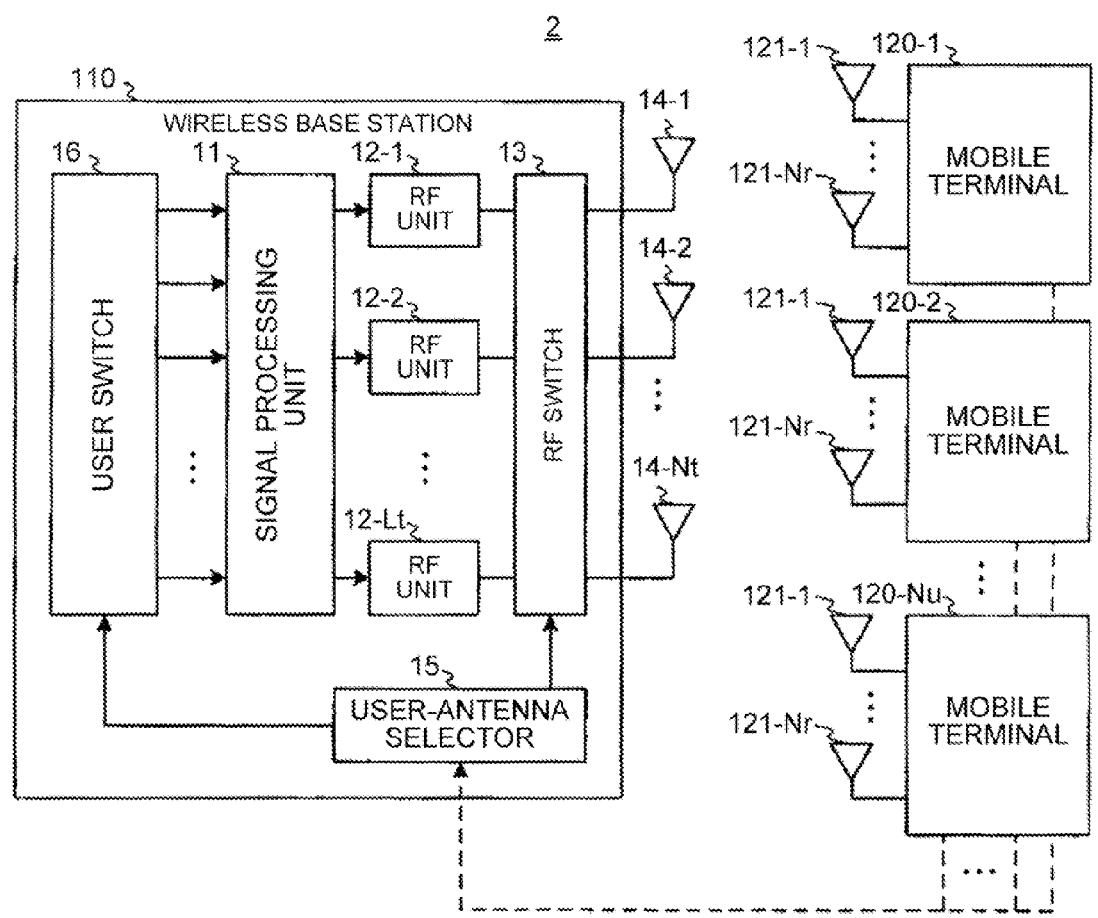
FIG. 5 is a block diagram that illustrates an exemplary configuration of a wireless communication system that performs MU-MIMO communication.

An explanation is given, with reference to FIG. 5, of the configuration of a wireless communication system 2, which is a first modified example of the MIMO wireless communication system 1. FIG. 5 is a block diagram that illustrates an exemplary configuration of the wireless communication system 2 that performs MU-MIMO wireless communication. The same components as those in the wireless communication system 1, which is illustrated in FIG. 1, that performs SU-MIMO wireless communication are denoted by the same numbers in FIG. 5, and their explanations may be omitted.

As illustrated in FIG. 5, the wireless communication system 2 includes a wireless base station 110 and mobile terminals 120 (i.e., mobile terminals 120-1 to 120-Nu), the number of which is Nu (Nu is an integer greater than or equal to 2). The wireless base station 110 is a transmitter and the mobile terminal 120 is a receiver for a downstream link. Conversely, the wireless base station 110 is a receiver and the mobile terminal 120 is a transmitter for an upstream link.

The wireless base station 110 includes the RF units 12 (i.e., RF units 12-1 to 12-Lt), the number of which is Lt (Lt is an integer greater than or equal to 2); the RF switch 13; the antennas 14 (i.e., antennas 14-1 to 14-Nt), the number of which is Nt; a user-antenna selector 15; and a user switch 16.

Each of the Nu mobile terminals 120 includes antennas 121 (i.e., antennas 121-1 to 121-Nr), the number of which is Nr (Nr is an integer greater than or equal to 1). Each of the Nu mobile terminals 120 may include the same number of antennas 121 or a different number of antennas 121. For ease of explanation, a case is explained below where each of the Nu mobile terminals 120 includes Nr number of antennas 121-1 to 121-Nr.

Data is input from multiple user terminals (not illustrated) and is to be transmitted to the Nu mobile terminals 120. The user switch 16 divides the data corresponding to each of the destination mobile terminals 120 and inputs the data to the signal processing unit 11.

The signal processing unit 11 performs an encoding process or signal process on the received data and inputs the data to the RF units 12-1 to 12-Lt.

The RF units 12-1 to 12-Lt perform a wireless transmission process on the divided data. The RF switch 13 connects the RF units 12-1 to 12-Lt with the antennas 14-1 to 14-Nt. The data, on which the wireless transmission process has been performed by the RF units 12-1 to 12-Lt, is transmitted via the antennas 14-1 to 14-Nt.

The user-antenna selector 15 selects which data is to be transmitted to which one of the Nu mobile terminals 120 and notifies the user switch 16 of the selection result. Furthermore, the user-antenna selector 15 selects which one of the antennas 14-1 to 14-Nt is to be used for transmitting data (in other words, selects which one of the RF units 12 is to be connected to which one of the antennas 14 by the RF switch 13 for transmission) and notifies the RF switch 13 of the selection result.

That is, the operation of the user-antenna selector 15 allows for the selection of the antenna 14 that is to transmit data and the antenna 121 that is to receive the data.

The user-antenna selector 15 gets, from each of the Nu mobile terminals 120, feedback on the measured value of the channel gain of the path between each of the antennas 14-1 to 14-Nt and each of the antennas 121-1 to 121-Nr of the mobile terminal 120. The user-antenna selector 15 may acquire the measured value of the channel gain from an internal processing circuit (not illustrated) included in the wireless base station 110 instead of getting feedback on the measured value of the channel gain from each of the mobile terminals 120.

The user-antenna selector 15 generates the channel matrix H, which is illustrated in the first or second operation example, by using the antennas 14-1 to 14-Nt included in the wireless base station 110 as transmitting antennas and by using all the antennas 121-1 to 121-Nr included in the Nu mobile terminals 120 as receiving antennas. In other words, the user-antenna selector 15 generates one channel matrix H for the antennas 121-1 to 121-Nr included in each of the mobile terminals 120-1 to 120-Nu all together.

Afterwards, by using the same operation as the first or second operation example of the above-described antenna selection operation, the user-antenna selector 15 selects transmitting and receiving antennas to be used for the MU-MIMO communication performed between the wireless base station 110 and the Nu mobile terminals 120.

Thus, in the wireless communication system 2, transmitting and receiving antennas are selected for the wireless base station 110 and the Nu mobile terminals 120 during the same operation as the first or second operation example of the above-described antenna selection operation. Therefore, the advantage that can be obtained by the first or second operation example of the above-described antenna selection operation can be produced for the MU-MIMO wireless communication performed between the wireless base station 110 and the mobile terminals 120.

(6-2) Second Modified Example

Figure 6:
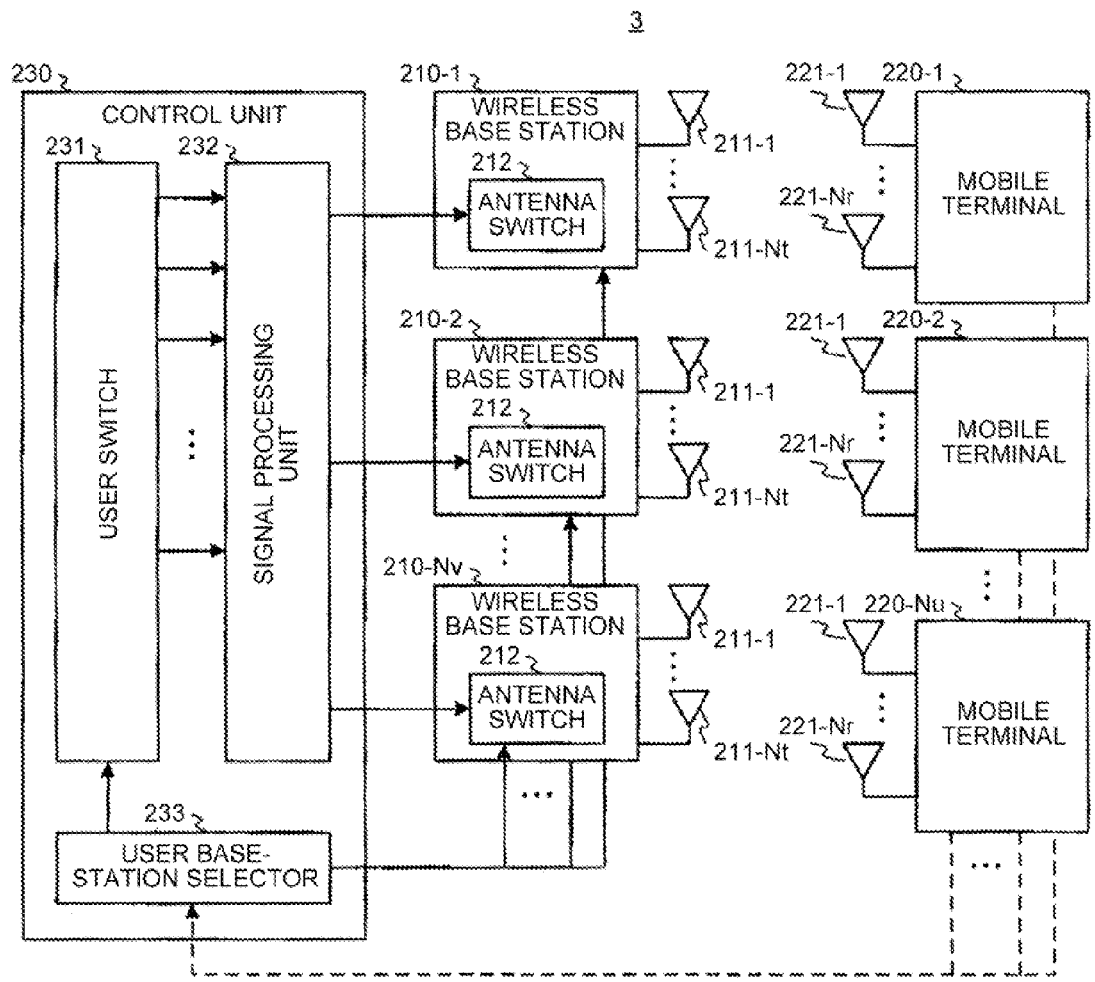
FIG. 6 is a block diagram that illustrates an exemplary configuration of a wireless communication system that performs CoMP-MU-MIMO communication.

An explanation is given, with reference to FIG. 6, of the configuration of a wireless communication system 3 that is a second modified example of the MIMO wireless communication system 1. FIG. 6 is a block diagram that illustrates an exemplary configuration of the wireless communication system 3 that includes CoMP-MU-MIMO wireless base stations 210. The same components as those illustrated in FIG. 1 or 5 are denoted by the same numbers in FIG. 6, and their explanations may be omitted.

As illustrated in FIG. 6, the wireless communication system 3 includes the wireless base stations 210 (i.e., wireless base stations 210-1 to 210-Nv), the number of which is Nv (Nv is an integer greater than or equal to 2); mobile terminals 220 (i.e., mobile terminals 220-1 to 220-Nu), the number of which is Nu (Nu is an integer greater than or equal to 2); and a control unit 230. In the CoMP-MU-MIMO, the wireless base stations 210-1 to 210-Nv transmit data to the mobile terminals 220-1 to 220-Nu in a coordinated manner under the control of the control unit 230.

Each of the Nv wireless base stations 210 includes antennas 211 (i.e., antennas 211-1 to 211-Nt), the number of which is Nt (Nt is an integer greater than or equal to 1); and an antenna switch 212. Each of the Nv wireless base stations 210 may include the same number of antennas 211 or a different number of antennas 211. For ease of explanation, a case is explained below where each of the Nv wireless base stations 210 includes Nt number of antennas 211-1 to 211-Nt Each of the Nu mobile terminals 220 includes antennas 221 (i.e., antennas 221-1 to 221-Nr), the number of which is Nr (Nt is an integer greater than or equal to 1). Each of the Nu mobile terminals 220 may include the same number of antennas 221 or a different number of antennas 221. For ease of explanation, a case is explained below where each of the Nu mobile terminals 220 includes Nr number of antennas 221-1 to 221-Nr.

The control unit 230 includes a user switch 231, a signal processing unit 232, and a user base-station selector 233.

Data is input from multiple user terminals (not illustrated) and is to be transmitted to the Nu mobile terminals 220. The user switch 231 divides the data corresponding to each of the destination mobile terminals 220 and inputs the data to the signal processing unit 232.

The signal processing unit 232 performs an encoding process or signal process on the received data and inputs the data to each of the Nv wireless base stations 210.

In response to an instruction from the user base-station selector 233 of the control unit 230, the antenna switches 212 of the wireless base stations 210-1 to 210-Nv transmit the received data, on which the wireless transmission process has been performed, via the antennas 211-1 to 211-Nt.

The user base-station selector 233 selects which data is to be transmitted to which one of the Nu mobile terminals 220 and notifies the user switch 231 of the selection result. Furthermore, the user base-station selector 233 selects which one of the antennas 211-1 to 211-Nt of the wireless base stations 210-1 to 210-Nv is to be used for transmitting data and notifies the antenna switches 212 of the wireless base stations 210-1 to 210-Nv of the selection result.

Specifically, the operation of the user base-station selector 233 allows for selection of the wireless base station 210, which transmits data, the antenna 211 of the wireless base station 210, the mobile terminal 220, which receives data, and the antenna 221 of the mobile terminal.

The user base-station selector 233 gets, from each of the Nu mobile terminals 220, feedback on the measured value of the channel gain of the path between each of the antennas 211-1 to 211-Nt and each of the antennas 221-1 to 221-Nr of the mobile terminals 220. The user base-station selector 233 may acquire the measured value of the channel gain from an internal processing circuit (not illustrated) included in the control unit 230 instead of getting feedback on the measured value of the channel gain from each of the mobile terminals 220.

The user base-station selector 233 generates the channel matrix H, which is illustrated in the first or second operation example, by using all the antennas 211-1 to 211-Nt included in the Nv wireless base stations 210 as transmitting antennas and by using all the antennas 221-1 to 221-Nr included in the Nu mobile terminals 220 as receiving antennas. In other words, the user base-station selector 233 generates one channel matrix H for the antennas 211-1 to 211-Nt included in each of the wireless base stations 210-1 to 210-Nv as transmitting antennas all together and for the antennas 221-1 to 221-Nr included in each of the mobile terminals 220-1 to 220-Nu as receiving antennas all together.

Afterwards, by using the same operation as the first or second operation example of the above-described antenna selection operation, the user base-station selector 233 selects transmitting and receiving antennas to be used for the CoMP-MU-MIMO communication performed between the Nv wireless base stations 210 and the Nu mobile terminals 220.

Thus, in the wireless communication system 3, transmitting and receiving antennas are selected for the Nv wireless base stations 210 and the Nu mobile terminals 220 during the same operation as the first or second operation example of the above-described antenna selection operation. Therefore, the advantage that can be obtained by the first or second operation example of the above-described antenna selection operation can be produced for the CoMP-MU-MIMO wireless communication performed between the wireless base stations 210 and the mobile terminals 220.

(6-3) Third Modified Example

Figure 7:
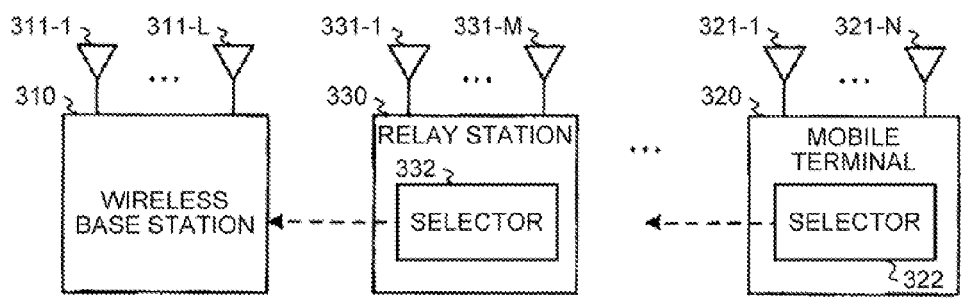
FIG. 7 is a block diagram that illustrates an exemplary configuration of a wireless communication system that performs MIMO ad hoc multihop communication.

An explanation is given, with reference to FIG. 7, of the configuration of a wireless communication system 4 that is a third modified example of the MIMO wireless communication system 1. FIG. 7 is a block diagram that illustrates the configuration of the wireless communication system 4, which is the third modified example of the MIMO wireless communication system 1 and performs MIMO ad hoc multihop wireless communication. In the wireless communication system 4, one or more relay stations 330 relays signals between a wireless base station 310 and a mobile terminal 320 that transmit and receive data to and from each other. The wireless base station 310 is a transmitter and the mobile terminal 320 is a receiver for a downstream link. Conversely, the wireless base station 310 is a receiver and the mobile terminal 320 is a transmitter for an upstream link.

The wireless base station 310 includes multiple antennas 311-1 to 311-L. The wireless base station 310 may have the same configuration as the wireless base station 10, which is illustrated in FIG. 1, with respect to the points not specified.

The mobile terminal 320 includes multiple antennas 321-1 to 321-N and a selector 322. The mobile terminal 320 may have the same configuration as the mobile terminal 20, which is illustrated in FIG. 1, with respect to the points not specified.

The relay station 330 includes multiple antennas 331-1 to 331-M and a selector 332. In the wireless communication system 4, multiple relay stations 330 may be installed between the wireless base station 310 and the mobile terminal 320. In such a case, all the relay stations 330 may have the same configuration.

In the wireless communication system 4, the selector 332 of the relay station 330 performs the same operation as the first or second operation example of the above-described antenna selection operation so as to select transmitting and receiving antennas to be used for the MIMO communication performed between the wireless base station 310 and the relay station 330. The selector 332 notifies the wireless base station 310 of the selected transmitting antenna and notifies an RF switch (not illustrated) of the relay station 330 of the selected receiving antenna. The wireless base station 310 and the relay station 330 transmit and receive data to and from each other by using the selected transmitting and receiving antennas.

The relay station 330 transmits data, which has been transmitted from the wireless base station 310, to a relay station (assuming it to be a relay station 330-2) that is the next relay point. The relay station 330-2 performs the same operation as the first or second operation example of the above-described antenna selection operation so as to select transmitting and receiving antennas to be used for the MIMO communication performed between the relay station 330 and the relay station 330-2. The selector 332 of the relay station 330-2 notifies the relay station 330 of the selected transmitting antenna and notifies an RF switch (not illustrated) of the relay station 330-2 of the selected receiving antenna. The relay station 330 and the relay station 330-2 transmit and receive data to and from each other by using the selected transmitting and receiving antennas.

As described above, in the wireless communication system 4, transmitting and receiving antennas are selected by using the same operation as the first or second operation example of the above-described antenna selection operation for the wireless base station 310, the relay station 330 that relays data, and the mobile terminal 320. Thus, the advantage that can be obtained by the first or second operation example of the above-described antenna selection operation can be produced for any device used in the multihop wireless communication.

The present invention is not limited to the above-described embodiments. Various changes may be made as appropriate without departing from the gist or concept of the invention that can be interpreted on the basis of the claims and the overall specification. A wireless communication system, a wireless communication method, and the like, for which such changes have been made, are also included in the technical scope of the present invention.

In the disclosed wireless communication system and wireless communication method, transmitting and receiving antennas to be used for the MIMO communication can be selected by a relatively small calculation process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication system that performs multiple-input multiple-output communication between a first wireless communication apparatus with a plurality of transmitting antennas and a second wireless communication apparatus with a plurality of receiving antennas, at least any one of the first and second wireless communication apparatuses comprising:
a first selecting unit that selects, from the transmitting antennas and the receiving antennas, a first pair which includes one transmitting antenna and one receiving antenna and for which the gain of a transmitted and received signal on a transmission path is largest;
a second selecting unit that calculates inverse matrices based on channel matrices with respect to pairs, each of which includes any one of the unselected transmitting antennas having not been selected by the first selecting unit and any one of the unselected receiving antennas having not been selected by the first selecting unit, and that selects a second pair from the pairs on the basis of the calculated inverse matrices; and
a communication unit that performs multiple-input multiple-output communication by using the selected transmitting antennas having been selected by the first selecting unit and the second selecting unit and the selected receiving antennas having been selected by the first selecting unit and the second selecting unit, wherein
the second selecting unit continues to calculate the inverse matrices and continues to select another second pair from the pairs until a predetermined number of the transmitting antennas and the receiving antennas have been selected.

2. The wireless communication system according to claim 1, wherein the second selecting unit calculates the inverse matrices in accordance with a signal to noise plus interference ratio that is calculated with respect to the pairs.

3. The wireless communication system according to claim 1, wherein the second selecting unit selects the second pair for which an element value of the last diagonal element is smallest among the calculated inverse matrices.

4. The wireless communication system according to claim 1, wherein the second selecting unit selects the second pair for which sum of diagonal elements is smallest among the calculated inverse matrices.

5. The wireless communication system according to claim 1, wherein the second selecting unit selects the second pair for which product of diagonal elements is smallest among the calculated inverse matrices.

6. The wireless communication system according to claim 1, wherein the second selecting unit selects the second pair for which a value obtained by summing an inverted element value of each diagonal element is largest among the calculated inverse matrices.

7. The wireless communication system according to claim 1, wherein the second selecting unit selects the second pair for which the largest value of element values of diagonal elements is smallest among the calculated inverse matrices.

8. The wireless communication system according to claim 1, the wireless communication system comprising a plurality of second wireless communication apparatuses, wherein
the first selecting unit selects, from the transmitting antennas of the first wireless communication apparatus and the receiving antennas of the second wireless communication apparatuses, the first pair which includes one transmitting antenna and one receiving antenna and for which the gain of a transmitted and received signal on a transmission path is largest,
the second selecting unit calculates inverse matrices based on channel matrices with respect to the pairs, each of which includes any one of the unselected transmitting antennas of the first wireless communication apparatus having not been selected by the first selecting unit and any one of the unselected receiving antennas of the second wireless communication apparatuses having not been selected by the first selecting unit, and
the communication unit performs multiuser multiple-input multiple-output communication by using the selected transmitting antennas having been selected by the first selecting unit and the second selecting unit and the selected receiving antennas having been selected by the first selecting unit and the second selecting unit.

9. The wireless communication system according to claim 1, the wireless communication system comprising a plurality of first wireless communication apparatuses and a plurality of second wireless communication apparatuses, wherein the first selecting unit selects, from the transmitting antennas of the first wireless communication apparatuses and the receiving antennas of the second wireless communication apparatuses, the first pair which includes one transmitting antenna and one receiving antenna and for which the gain of a transmitted and received signal on a transmission path is largest, the second selecting unit calculates inverse matrices based on channel matrices with respect to pairs, each of which includes any one of the unselected transmitting antennas of the first wireless communication apparatuses having not been selected by the first selecting unit and any one of the unselected receiving antennas of the second wireless communication apparatuses having not been selected by the first selecting unit, and the communication unit performs cooperative multi-point (CoMP) multiuser multiple-input multiple-output communication by using the selected transmitting antennas having been selected by the first selecting unit and the second selecting unit and the selected receiving antennas having been selected by the first selecting unit and the second selecting unit.

10. A wireless communication method for performing multiple-input multiple-output communication between a first wireless communication apparatus with a plurality of transmitting antennas and a second wireless communication apparatus with a plurality of receiving antennas, the wireless communication method comprising:

first selecting, from the transmitting antennas and the receiving antennas, a first pair which includes one transmitting antenna and one receiving antenna and for which the gain of a transmitted and received signal on a transmission path is largest;

calculating inverse matrices based on channel matrices with respect to pairs, each of which includes any one of the unselected transmitting antennas having not been selected at the first selecting and any one of the unselected receiving antennas having not been selected at the first selecting, and second selecting a second pair from the pairs on the basis of the calculated inverse matrices; and performing multiple-input multiple-output communication by using the selected transmitting antennas having been selected at the first selecting and the second selecting and the selected receiving antennas having been selected at the first selecting and the second selecting, wherein the second selecting includes continuing to calculate the inverse matrices and continuing to select another second pair from the pairs until a predetermined number of the transmitting antennas and the receiving antennas have been selected.

11. A selecting apparatus comprising:

a memory; and a processor coupled to the memory, wherein the processor executes a process comprising:

first selecting, from transmitting antennas of a first wireless communication apparatus and receiving antennas of a second wireless communication apparatus, a first pair which includes one transmitting antenna and one receiving antenna and for which the gain of a transmitted and received signal on a transmission path is largest;

calculating inverse matrices based on channel matrices with respect to pairs each of which includes any one of the unselected transmitting antennas having not been selected at the first selecting and any one of the unselected receiving antennas having not been selected at the first selecting and second selecting a second pair from the pairs on the basis of the calculated inverse matrices.

12. The selecting apparatus according to claim 11, wherein the second selecting includes continuing to calculate the inverse matrices and continuing to select another second pair from the pairs until a predetermined number of the transmitting antennas and the receiving antennas have been selected.

* * * * *